United States Patent [19]
Bray

[11] Patent Number: 4,708,790
[45] Date of Patent: Nov. 24, 1987

[54] ULTRAFILTRATION SYSTEM WITH REGENERATION CONTROL

[75] Inventor: James W. Bray, West Chester, Ohio

[73] Assignee: Champion International Corporation, Stamford, Conn.

[21] Appl. No.: 892,896

[22] Filed: Aug. 1, 1986

Related U.S. Application Data

[63] Continuation of Ser. No. 616,912, Jun. 4, 1984, abandoned.

[51] Int. Cl.⁴ ............................................. B01D 13/00
[52] U.S. Cl. ...................................... 210/87; 210/106; 210/433.2; 210/321.69
[58] Field of Search ............... 210/138, 106, 140, 142, 210/143, 433.2, 321.1, 927, 90, 87

[56] References Cited

U.S. PATENT DOCUMENTS

| | | | |
|---|---|---|---|
| 3,992,301 | 11/1976 | Shippey et al. | 210/636 |
| 4,005,013 | 1/1977 | Hinton | 210/106 |
| 4,341,642 | 7/1982 | Koepke et al. | 210/142 X |
| 4,370,983 | 2/1983 | Lichtenstein | 210/321.2 X |
| 4,444,596 | 4/1984 | Gortz et al. | 210/90 X |

FOREIGN PATENT DOCUMENTS 2601859 7/1976 Fed. Rep. of Germany ...... 210/636

Primary Examiner—Frank Spear
Attorney, Agent, or Firm—Evelyn M. Sommer

[57] ABSTRACT

An ultrafiltration system has a plurality of filter modules coupled in a parallel arrangement. The flow rate at the output of each filter module is detected. When the flow rate of a given module falls below a threshold value, that module is disconnected from the ultrafiltration system and automatically coupled into a regeneration circuit so that the filter module can be cleaned. Once regenerated, the filter module is recoupled into the ultrafiltration system. If the regeneration circuit is already in use when a filter module is detected to be in need of regeneration, that module is placed in a queue for regeneration once the regeneration circuit is free, and all other modules previously placed in queue have been regenerated. While awaiting regeneration, the filter modules are kept in service in the ultrafiltration system.

8 Claims, 5 Drawing Figures

ULTRAFILTRATION SYSTEM WITH REGENERATION CONTROL

This application is a continuation of application Ser. No. 616,912, filed Jun. 4, 1984, now abandoned.

BACKGROUND OF THE INVENTION

The present invention relates to an ultrafiltration system for removing impurities from liquids, such as water, and more particularly to a modular ultrafiltration system having an automatic filter regeneration capability.

Industrial processes require high purity water in large quantities for many different purposes, such as in paper pulp processes, cleaning components, producing steam, and formulating chemical solutions such as photoresists, etchants, plating baths, drugs, cosmetics, and a great many other products. Impurities found in municipal tap water can create large problems for manufacturers. Even microscopic contaminates can be disastrous, for example, in the manufacture of integrated circuits where any such contaminates can ruin the electronic circuitry embedded in the microchip. In the manufacture of foods and beverages, contamination can produce odors, discoloration, undesirable tastes and ultimately lead to outright spoilage. For these and other reasons it is necessary to purify water prior to its use in manufacturing operations. Additionally, with more stringent anti-pollution standards and the increasing cost of water, it has become necessary to treat most waste water or effluent streams leaving manufacturing facilities in order to control the biological oxygen demand (BOD), color, temperature, and pH thereof prior to discharge from a processing plant into a water course, lake, stream, pond or the like.

One technique that has proven quite useful and versatile in the removal of a large variety of pollutants and foulants from water influents and effluents is, for example, the ultrafiltration process disclosed in U.S. Pat. No. 3,758,405. However, the use of ultrafiltration membranes as disclosed in said patent necessitates frequent and rather difficult cleaning operations because of fouling and membrane failure caused by scale, slime or other foulant layer build up on the surface of the ultrafiltration membrane. Typically, such membranes require almost daily cleaning with extreme care as to the cleaning agents, temperature and pH conditions employed in order to prevent chemical attack or degradation of the membrane itself.

Ultrafiltration is a membrane process for the concentration of dissolved materials in aqueous solutions. A semipermeable membrane is used as the separating agent and pressure is used as the driving force. In an ultrafiltration process, a feed solution is introduced into a membrane unit or cell where water and certain solutes pass through the membrane. The membrane has a predetermined pore size and the feed solution is applied under a hydrostatic pressure. Solutes, whose sizes are greater than the pore size of the membrane, are retained and concentrated. The pore structure of the membrane thus acts as a molecular filter, passing some of the smaller size solutes and retaining the larger size solutes. The pore structure of this molecular filter is such that it does not become plugged because the solutes are rejected at the surface and do not penetrate the membrane. Furthermore, there is no continuous build-up of a filter cake which has to be removed periodically to restore flux (rate of solution transport through the membrane) since concentrated solutes are removed in solution. However, slimes, scales and other foulants such as humic acid (a forest floor decomposition product often times found in raw water) can build up on the membrane surface increasing the system pressure and reducing the flux thereby necessitating frequent cleaning or "regeneration" thereof.

In commercial operation, the number of ultrafiltration cells or "filter modules" to be used is determined by the total volume of the stream to be treated, the membrane area, and the separation efficiency which is affected by composition and pH of the stream, temperature and pressure of operation, and feed flow rate through the membrane number of ultrafiltration cells required can be easily calculated in a conventional manner. In addition, in order to avoid process disruption from membrane fouling and high operating pressures, cells have, in the past, been arranged in stages separated by pumps so that the stream can be passed sequentially through each stage. In this manner, a stage or stages can be removed from the system to enable membrane cleaning without closing down the entire ultrafiltration system.

In ultrafiltration systems known to date, the removal of filter modules for cleaning has been done manually, which is time consuming and not cost effective. It would therefore be advantageous to provide an ultrafiltration system with automatic or semi-automatic controls for effecting the regeneration of filter modules.

In order to provide such operation, it would be further advantageous to provide a means for detecting when a filter module is in need of regeneration. Such detection would enable the triggering of automatic controls to start the regeneration process. For economic reasons, it would be advantageous to provide a single regeneration apparatus which could be used to clean a plurality of filter modules in need of regneration, one at a time. When the regeneration apparatus is in use for cleaning one filter module, it would be advantageous to leave any additional filter modules in need of regeneration in the ultrafiltration system, taking such additional modules out of the system one at a time only during the period in which they are being regenerated.

The present invention relates to such an ultrafiltration system.

SUMMARY OF THE INVENTION

In accordance with the present invention, an ultrafiltration system is provided which comprises a plurality of filter modules coupled in a parallel arrangement to a liquid input conduit and a permeate output conduit. Means are provided for detecting the permeate flow rate or pressure at the output of each filter module. Means responsive to the detecting means are provided for generating a regeneration signal for a particular filter module if the permeate flow rate or pressure at the output of that filter module falls below a threshold value. Valve means disconnects a filter module to be cleaned from the parallel arrangement and couples it into a filter regeneration circuit in response to a regeneration signal which has been generated for that filter module. Once coupled into the filter regeneration circuit, the filter module is automatically regenerated. After regeneration, the regenerated filter module is recoupled into the parallel arrangement between the liquid input conduit and permeate output conduit. Memory means are provided for storing any regeneration signals, indicative of additional filter modules in need of regeneration, which are generated while the regeneration circuit is in use. Means are also provided for subsequentially regenerating any such additional filter modules in response to stored regeneration signals.

The filter regeneration circuit can comprise a tank having an input port and an output port. The tank is used for preparing regeneration chemicals to be used in the regeneration process. A first conduit couples one port of the tank to the input of a filter module to be regenerated. A second conduit couples an output of the filter module to be generated to the other tank port. Pump means circulates the regeneration chemicals from the tank to the filter module to be regenerated via the first and second conduits.

Each of the filter modules can comprise separate permeate and regeneration outputs. The permeate output is used during the ultrafiltration process. The separate regeneration output is used only when the filter module is being cleaned.

In operation, all of the filter modules operate in parallel to provide the necessary filtration. When one of the filter modules is in need of regeneration, as detected by a reduced flow rate or pressure at the output of the filter module, it is automatically taken out of the filtration circuit and placed into a regeneration circuit. If the regeneration circuit is in use with one filter module when another filter module is detected to be in need of regeneration, the second (and any subsequent) filter module to be cleaned is kept in the filter circuit, but a note is made by the control system to commence regeneration of the second module upo completion of the process with the first module. In this manner, only one filter module will be removed from the filtration circuit at a time, and modules to be cleaned are stored in a queue for subsequent regeneration in sequential order.

DETAILED DESCRIPTION OF A PREFERRED EMBODIMENT

Figure 1A:
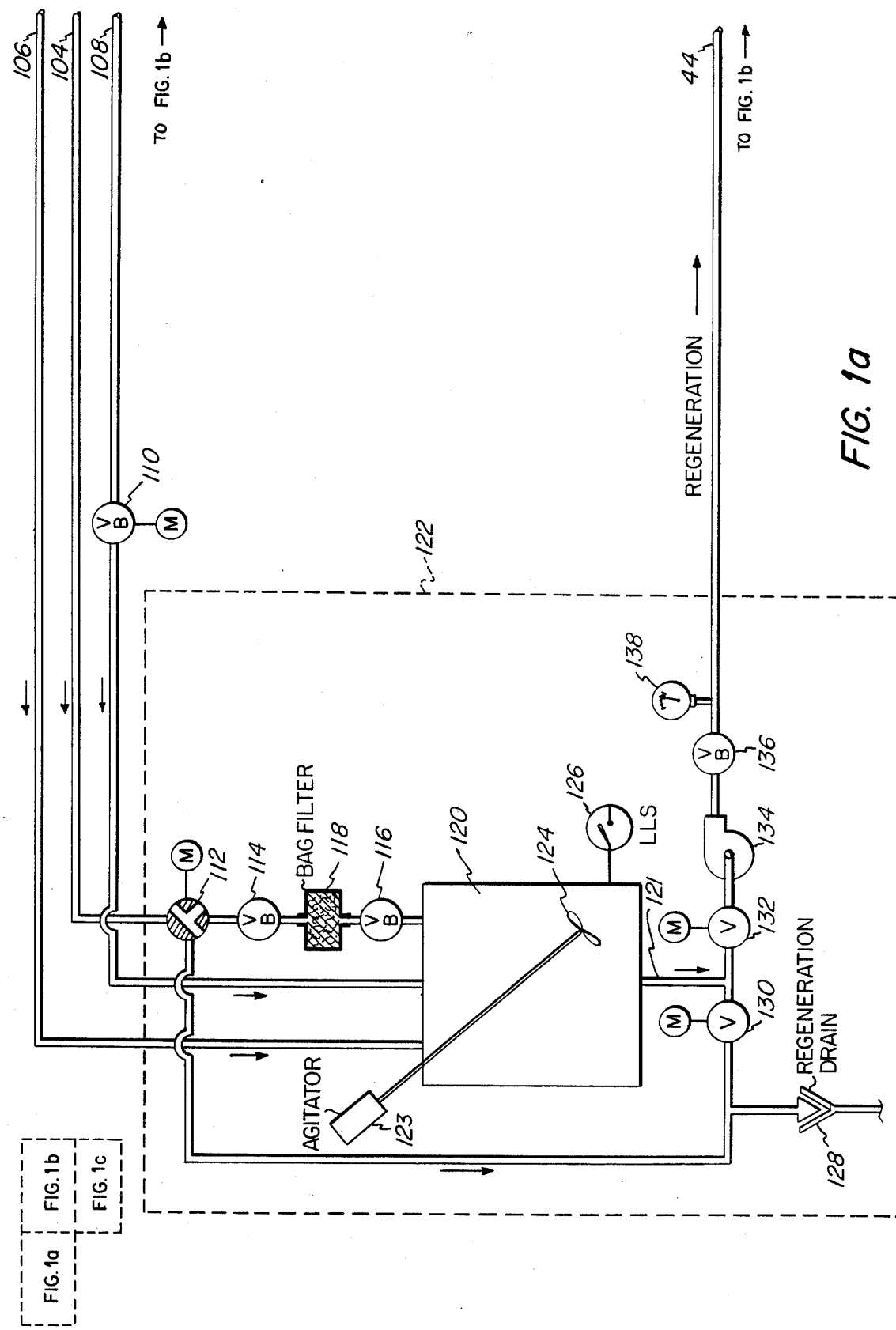
FIGS. 1a, 1b and 1c form a schematic diagram of an ultrafiltration system in accordance with the present invention.
Figure 1B:
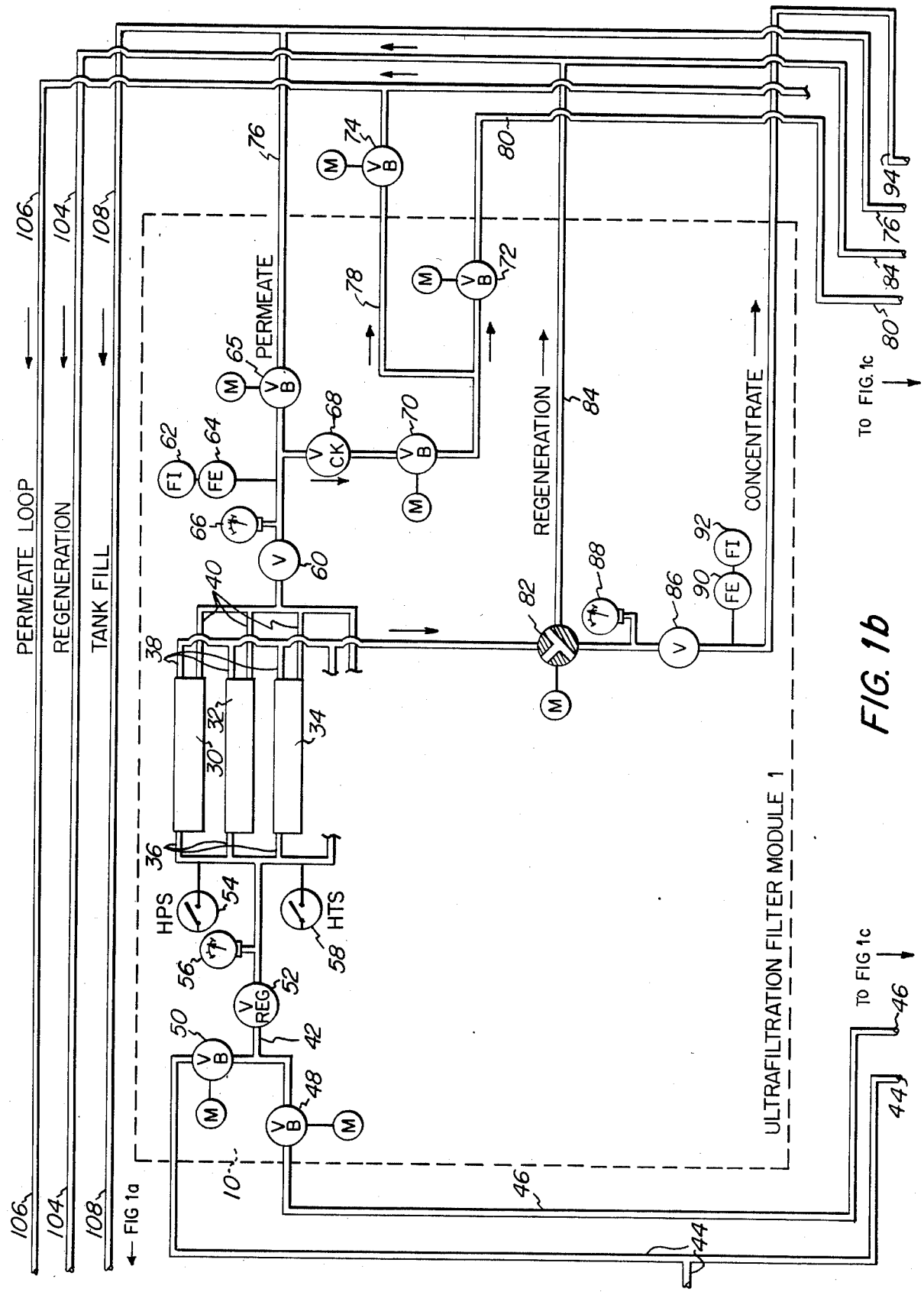
Figure 1C:
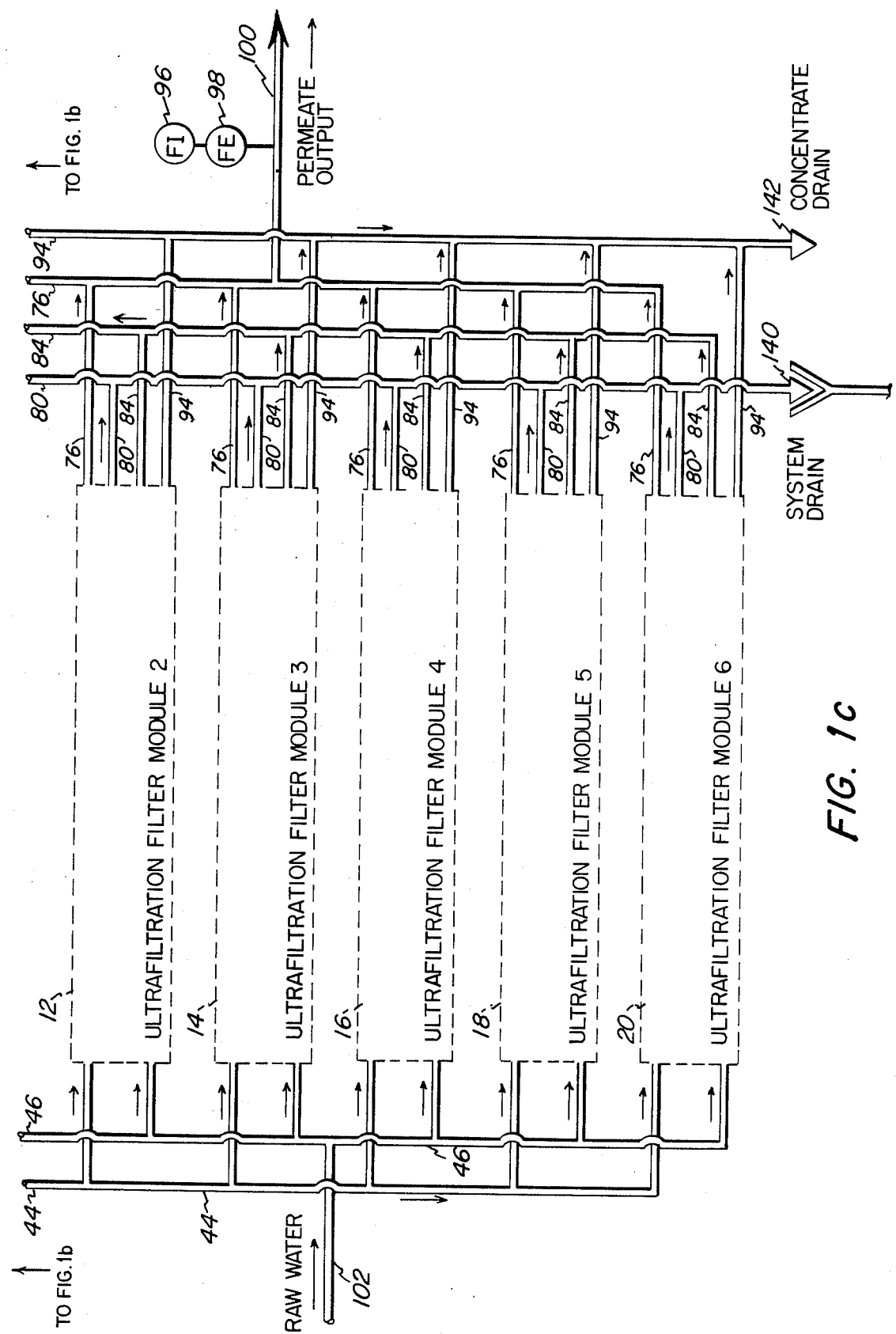

FIGS. 1a, 1b and 1c depict, in schematic diagram form, an embodiment of an ultrafiltration system in accordance with the present invention. The system shown includes six ultrafiltration filter modules 10, 12, 14, 16, 18, and 20. A greater or fewer number of ultrafiltration filter modules could be accomodated in a system in accordance with the present invention. The components of ultrafiltration filter module 1 are shown in detail within dashed box 10. Identical components, not shown in detail, are included in each of the ultrafiltration modules depicted by dashed boxes 12, 14, 16, 18, and 20.

As shown in box 10, each ultrafiltration filter module includes a plurality of membrane cartridges 30, 32, and 34. Additional cartridges can be added depending upon the flow requirements of the specific ultrafiltration system being designed. Ultrafiltration membrane cartridges 30, 32, and 34 each have an input 36, a regeneration output 38, and a permeate output 40. Inputs 36 are coupled, in parallel, to a common feed conduit 42 having a pressure regulator valve 52 in series therewith. Feed conduit 42 also has a pressure gage 56 coupled thereto so that the pressure of liquid flowing through the conduit can be monitored. A high pressure switch 54 and high temperature switch 58 are provided to shut the ultrafiltration system down should the pressure or temperature on the input side of the ultrafiltration membrane cartridge exceed a safe value.

Feed conduit 42 is coupled to receive, alternatively, the flow of raw water to be processed via liquid input conduit 46 or a regeneration solution via a regeneration circuit conduit 44. Motor driven ball valves 48 and 50 are actuated to couple conduit 46 or 44, respectively, to feed conduit 42. The operation of motor driven ball valves 48 and 50 is preferably mutually exclusive; in other words, when valve 48 is open, valve 50 will be closed and when valve 50 is open, valve 48 will be closed. Thus, the input to filter membrane cartridges 30, 32, and 34 will be either raw water or a regeneration solution, but not both. The opening and closing of ball valves 48 and 50 is controlled by an electronic controller to be described below.

On the output side of membrane cartridges 30, 32, and 34, the permeate outputs 40 are coupled in parallel to a permeate output conduit 76. The permeate which flows through conduit 76 is the ultrafiltered raw water produced by membrane cartridges 30, 32, and 34. The permeate flows through a flow control valve 60 after exiting from permeate outputs 40. A pressure gage 66 monitors the pressure of permeate in the permeate output conduit 76. A flow indicator 62 and flow element 64 provide a flow metering means for detecting the permeated flow rate at the output of the ultrafiltration filter module.

A motor driven ball valve 65 in series with permeate output conduit 76 ca be used to turn off the permeate flow from the ultrafiltration filter module. Like motor driven ball valves 48 and 50, valve 65 is controlled by an electronic controller.

As shown in FIGS. 1b and 1c, the filter modules 10, 12, 14, 16, 18, and 20 are coupled in a parallel arrangement to liquid input conduit 46 and permeate output conduit 76. The raw water input to the system for ultrafiltration is carried by conduit 102 which is coupled to liquid input conduit 46. On the output side of the system, permeate flows through conduit 100 which is coupled to permeate output conduit 76. As indicated, a flow indicator 96 and flow element 98 are coupled to conduit 100 to measure the total flow rate of permeate output from the ultrafiltration system.

Permeate output from membrane cartridges 30, 32, and 34 can be directed to system drain conduit 80 instead of permeate output conduit 76 by closing ball valve 65. In this instance, permeate will flow through check valve 68, motor driven ball valves 70 and 72 (which must be opened), and through system drain conduit 80 to system drain 140.

Another circuit to which permeate can be directed is permeate loop 106. By closing motor driven ball valves 65 and 72 and opening motor driven ball valves 70 and 74, permeate will flow via conduit 78 to permeate loop 106, which is coupled to a tank 120 in regeneration module 122. Tank 120 can be filled with any desired additive or chemical ingredient for mixing with permeate exiting from permeate loop conduit 106.

A more important feature of regeneration module 122 is its use in cleaning, or "regenerating" the filter membranes 30, 32, 34 of the ultrafiltration filter modules 10, 12, 14, 16, 18, and 20. Regeneration module 122 forms one part of a regeneration circuit or "flow path" into which individual ultrafiltration filter modules can be selectively coupled. Tank 120 has an input port for each of permeate loop conduit 106, regeneration circuit conduit 104, and tank fill conduit 108. Tank 120 also includes an output port 121. Liquid from tank 120 can be drained from the system by closing motor driven valve 132 and opening motor driven valve 130. Liquid from tank 120 will then drain through regeneration drain 128. Alternatively, liquid from tank 120 can be circulated through the regeneration circuit via regeneration conduit 44 by opening valve 132 and closing valve 130. Pump 134 draws liquid from tank 120 to circulate it through the regeneration circuit. A manually operated ball valve 136 is provided at the output of pump 134, together with a pressure gage 138 to monitor the fluid pressure and enable an operator to shut off the regeneration flow path in case of an emergency or other problem. Low level switch 126 is coupled to tank 120 to provide a safety shut off.

In operating the regeneration portion of the present ultrafiltration system, regeneration chemicals are mixed in tank 120. The chemicals can be stirred by agitator 124, which is rotated by agitator motor 123. The chemical regeneration solution can comprise, for example, that described in commonly assigned U.S. patent application Ser. No. 602,741 filed Apr. 26, 1984 and entitled "MEMBRANE CLEANING PROCESS".

Once mixed, the chemical regeneration solution is circulated through regeneration conduit 44 and into the input ports 36 of the ultrafiltration membrane cartridges 30, 32, and 34 of one of the ultrafiltration filter modules. If, for example, ultrafiltration filter module 1 is to be regenerated, motorized ball valve 48 shown in box 10 will be closed and valve 50 will be opened so that the input of the ultrafiltration module will be coupled to the regeneration circuit. The permeate outputs 40 of the ultrafiltration membrane cartridges 30, 32, and 34 will be closed by closing each of motor driven ball valves 65 and 70. Regeneration outputs 38 of the ultrafiltration membrane cartridges will be coupled to the regeneration circuit via conduit 84 by appropriate adjustment of three-way motor operated ball valve 82. The regeneration solution will flow from conduit 84, through regeneration circuit return conduit 104, and back to regeneration module 122. Motor operated three-way ball valve 112 in regeneration module 122 can be adjusted to direct the return flow of the regeneration solution to either tank 120 (via ball valves 114, 116 and bag filter 118), or directly back to the regeneration circuit via motor driven valve 130, bypassing tank 120. The return solution could alternatively be drained through regeneration drain 128.

In order to mix chemicals for the regeneration solution in tank 120, tank fill conduit 108, which is coupled to permeate output conduit 76, is provided. A motor driven ball valve 110 in series with tank fill conduit 108 can be opened to fill tank 120 with permeate from the ultrafiltration system.

The regeneration solution will circulate through the ultrafiltration module for a time period sufficient to clean the ultrafiltration membranes. Once cleaning has been acheived, motor operated three-way ball valve 82 will be actuated to couple the regeneration outputs 38 of the membrane cartridges to concentrate conduit 94, via valve 86. A pressure gage 88 is coupled to concentrate conduit 94 within each ultrafiltration filter module to provide an indication of the pressure in the concentrate conduit. Flow indicator 92 and flow element 90 are coupled to concentrate conduit 94 to detect the concentrate flow rate. Concentrate conduit 94 leads to concentrate drain 142, through which the concentrate is expelled from the ultrafiltration system.

When regeneration of a particular ultrafiltration filter module is complete, the module is recoupled to the parallel arrangement of other ultrafiltration filter modules. This is accomplished by closing motor driven ball valve 50 and opening motor driven ball valve 48 on the input side of the regenerated ultrafiltration filter module. At the same time, three-way motor driven ball valve 82 is closed and motor driven ball valve 65 is opened on the output side of the regenerated ultrafiltration module. Thus, the regenerated ultrafiltration module will again be in service to filter raw water from liquid input conduit 46, thereby creating filtered permeate to be expelled from conduit 100 coupled to permeate output conduit 76.

Figure 2:
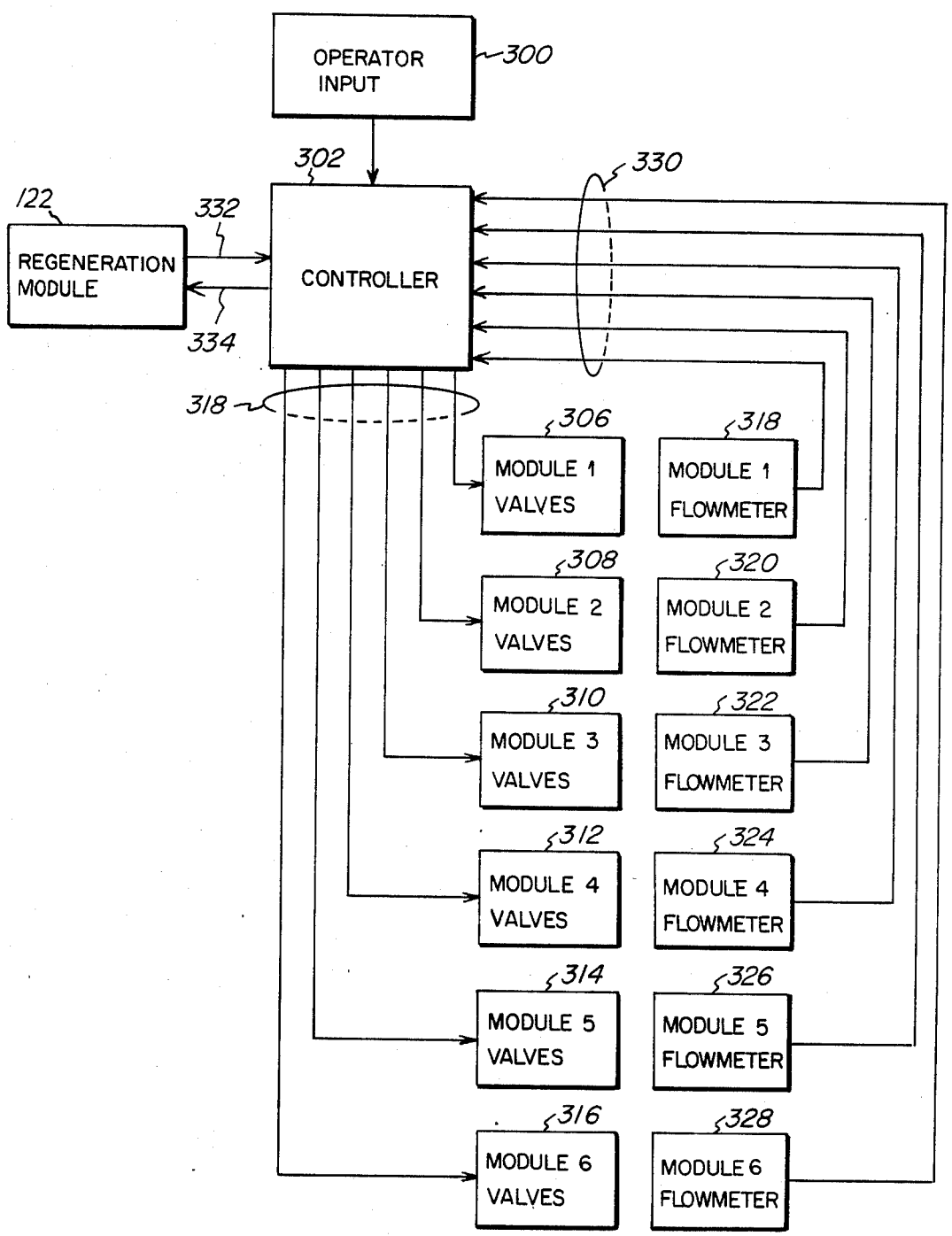
FIG. 2 is a block diagram of the electrical control system used to control the operation of the ultrafiltration system shown in FIG. 1.
Figure 3:
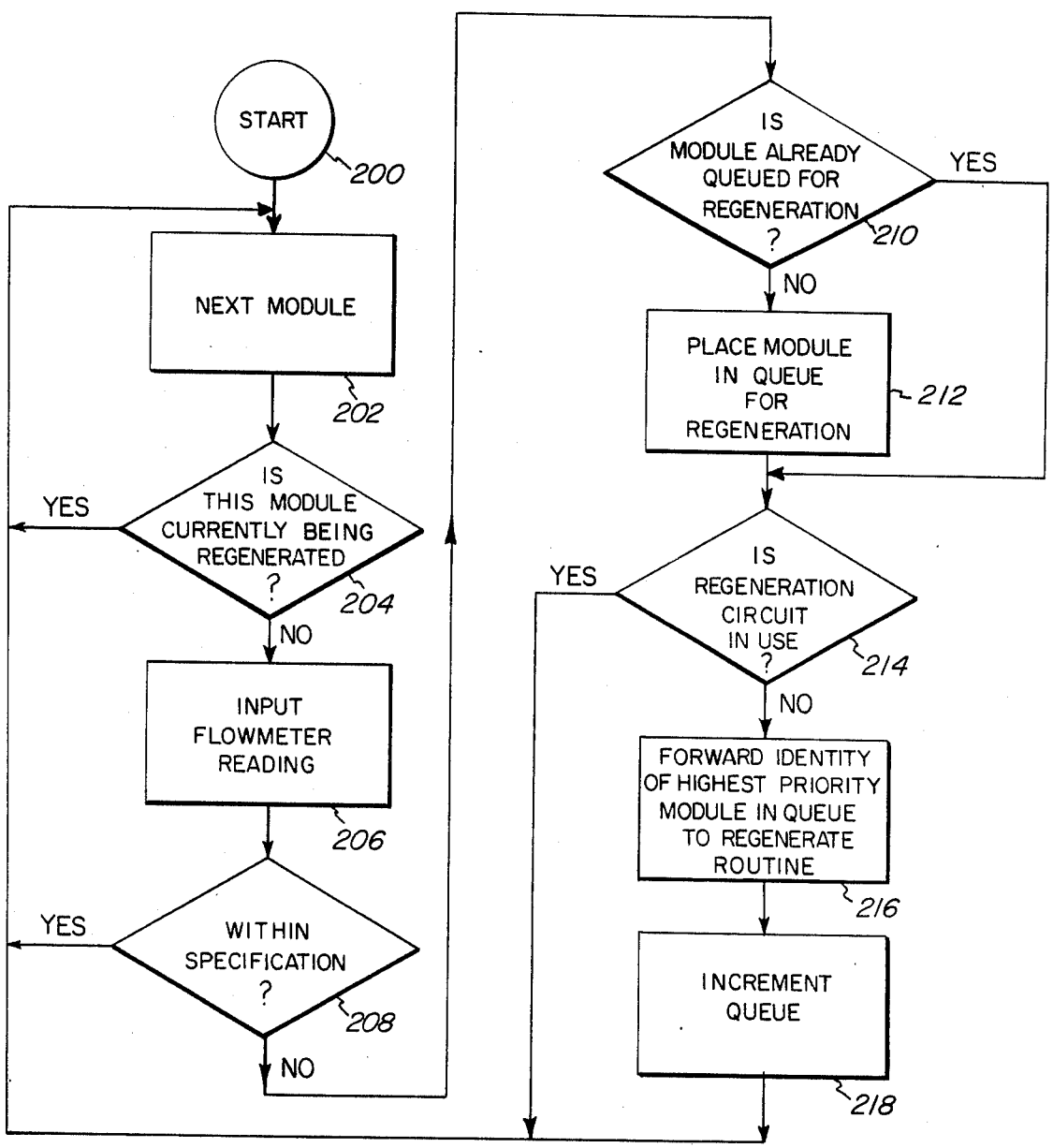
FIG. 3 is a flow chart showing a sequence of steps which can be used to detect and queue filter modules to be regenerated.

Turning now to FIGS. 2 and 3, the control means for coupling ultrafiltration filter modules between the parallel filtration arrangement and the regeneration circuit will be described. A controller 302, which can comprise a microprocessor based programmable controller, such as a SY/MAX programmable controller manufacturered by the Square D Company, is provided with an operator input panel 300 to enable an operator to interface with the ultrafiltration system. Controller 302 is coupled by lines 318 to the various motor driven valves in each of the ultrafiltration filter modules. Module 1 valves 306 are those contained in ultrafiltration module 1, as shown in box 10 of FIG. 1b. Module 2 through module 6 valves 308, 310, 312, 314, and 316 are those associated with the ultrafiltration modules designated by dashed boxes 12, 14, 16, 18, and 20 shown in FIG. 1c. The motor driven valves in each of the ultrafiltration filter modules are controlled by outputs carried on lines 318 from controller 302. Controller 302 places ultrafiltration filter modules into the regeneration circuit in response to information from the flow meter assembly 62, 64 in each module. When the detected flow rate at the output of a filter module drops below a threshold value (e.g., 25 gallons per minute), a regeneration signal is generated by the flowmeter to trigger controller 302 to commence a regeneration cycle as appropriate. In FIG. 2, the flowmeter from ultrafiltration filter module 1 is designated by reference numeral 318. Flowmeters from modules 2 through 6 are designated by reference numerals 320, 322, 324, 326, and 328 respectively. Signals from the ultrafiltration filter module permeate output flowmeters are transmitted to controller 302 via lines 330.

Controller 302 is also coupled to regeneration module 122 via lines 332 and 334. Inputs to regeneration module 122 from controller 302 are carried on line 334 to control the various motor driven valves in the regeneration module. Output signals from regeneration module 122, carried to controller 302 on line 332, comprise the output from low level switch 126, and any other detectors and alarms which may be placed in regeneration module 122.

Controller 302 is programmed to supervise the selection of ultrafiltration filter modules to be regenerated. Controller 302 also controls the timing and sequence of steps in the regeneration process. Selection of ultrafiltration modules to be regenerated is accomplished in accordance with a program such as that flow charted in FIG. 3.

Upon entering the routine shown in FIG. 3 at box 200, the program advances to consider the first ultrafiltration filter module in the system, as indicated at box 202. At box 204, the routine determines if this ultrafiltration filter module is currently being regenerated. If it is, the routine returns to box 202 and considers the next module in the system. Otherwise control is passed to box 206, and the flowmeter reading from the ultrafiltration filter module being interrogated is input to controller 302.

Controller 302 takes the flowmeter reading which has been input, and tests it to determine if it is within specification. If the flow rate is within specification, (i.e., above the threshold flow rate) control returns to box 202 so that the next ultrafiltration filter module can be interrogated. If, however, the flow rate has fallen below a threshold value, indicating that the filter module is in need of cleaning, control passes to box 210 which determines if the module has already been queued for regeneration. Such would be the case if, during a previous loop of the routine, the flow rate of permeate output from the module had already been detected as haven fallen below the threshold value. If the module has already been queued for regeneration, there is no need to place it in queue again. Thus, box 212 is skipped. If a module has not already been queued for regeneration, it will be placed in queue at box 212. Control then passes to box 214, where a determination is made by controller 302 as to whether or not the regeneration circuit is currently in use. If it is, control passes back to box 202 and the next module is interrogated, the present module having been placed in queue for subsequent regeneration. If, at box 214, it has been determined that the regeneration circuit is not currently in use, then a new module can be regenerated. Box 216 will forward the identity of the highest priority module in the queue to a regeneration routine. Thus, the next module to be regenerated will be placed, by the regeneration routine, into the regeneration circuit. At box 218, the queue will be incremented to delete the module just passed to the regeneration routine from the queue, and the next successive module to be regenerated will receive the highest priority in the queue for regeneration next time the regeneration circuit is free. Control then passes from box 218 back to box 202, so that the next module can be interrogated.

As will be appreciated, the routine shown in FIG. 3 will continuously loop through each of the ultrafiltration filter modules in the ultrafiltration system. As the flow rate of the permeate output from each module decreases to a point where regeneration is necessary, the module will either immediately be placed in the regeneration circuit (if the regeneration circuit happens to be free), or be placed in queue so that the module will be regenerated subsequently and in turn. When in queue for regeneration, the ultrafiltration filter modules will remain in the parallel arrangement with the other filters not being regenerated and continue to filter raw water input thereto via liquid input conduit 46.

It will now be appreciated that the present invention concerns an ultrafiltration system of the modular type with a regeneration module for regenerating one ultrafiltration filter module at a time. The regeneration module contains a chemical tank for preparation of regeneration chemicals which are circulated through an ultrafiltration filter module being cleaned.

One use for the ultrafiltration system of the present invention is to obtain a water that is devoid of non-reative silica for feeding a boiler in a paper mill. Ultrafiltration membranes used in the ultrafiltration filter modules for such an application can be of spiral wound configuration, rated to remove non-reative silica. The membrane material can be constructed of non-celluloic polysulfone with 10,000 molecular weight cut off. The size and number of ultrafiltration filter modules will be selected to produce the desired flow rate of filtered water with one filter module in the regeneration circuit and the remaining modules in service. The system controller can be advantageously used to monitor various alarms (e.g., temperature, pressure, conductivity, etc.) necessary to ensure that the system is operating safely.

What is claimed is:

1. An ultrafiltration system comprising:
   a plurality of filter modules coupled in a parallel arrangement to a liquid input conduit and a permeate output conduit;
   means for detecting the permeate flow rate or pressure at the output of each filter module;
   means responsive to said detecting means for generating a regeneration signal for a filter module if the permeate flow rate or pressure at the output of such filter module falls below a threshold value;
   valve means for disconnecting a filter module from said parallel arrangement and coupling it into a filter regeneration circuit in response to a regeneration signal which has been generated for that filter module;
   means for automatically regenerating a filter module coupled into said filter regeneration circuit;
   means for recoupling a regenerated filter module into said parallel arrangement after it has been regenerated;
   controller means for storing any regeneration signals, indicative of additional filter modules in need of regeneration, which are generated while said regeneration circuit is in use and for supervising the selection of said filter modules to be regenerated and sequence of their regeneration as based on the order of receipt of said regeneration signals; and
   means for subsequently sequentially regenerating any such additional filter modules in response to stored regeneration signals.

2. The ultrafiltration system of claim 1 wherein said filter regeneration circuit comprises:
   a tank having an input port and an output port, said tank to be used for preparation of regeneration chemicals;
   a first conduit for coupling one port of the tank to the input of a filter module to be regenerated;
   a second conduit for coupling an output of the filter module to be regenerated to the other tank port; and
   pump means for circulating regeneration chemicals from said tank through the filter module to be regenerated via the first and second conduits.

3. The ultrafiltration system of claim 2 wherein each of said filter modules comprises separate permeate and regeneration outputs.

4. The ultrafiltration system of claim 3 further comprising means for filling said tank with permeate for use in preparing regeneration chemicals, said means comprising a third conduit coupling said tank to the permeate output of at least one of said filter modules.

5. The ultrafiltration system of claim 3 wherein said second conduit couples said tank to the regeneration output of the filter module to be regenerated.

6. The ultrafiltration system of claim 3 wherein said means for detecting the permeate flow rate comprises a separate flowmeter connected to the permeate output of each filter module.

7. An ultrafiltration system comprising:
a plurality of filter modules each having an input, a permeate output and a regeneration output;
an input conduit;
an output conduit;
a regeneration flow path;
first valve means for coupling individual filter module inputs to either said input conduit or said regeneration flow path;
second valve means for coupling individual filter module permeate outputs to said output conduit or alternatively coupling regeneration outputs to said regeneration flow path;
means for detecting the flow rate of permeate exiting from the permeate output of each filter module; and
control means coupled to said first and second valve means and said detecting means comprising:
means for actuating said first and second valve means, upon system start-up, to couple each of said filter module inputs to said input conduit and each of said permeate outputs to said output conduit;
means responsive to said detecting means for actuating said first and second valve means to couple a filter module's input and regeneration output to said regeneration flow path when the flow rate of permeate exiting from the permeate output of that filter module falls below a predetermined value and the regeneration flow path is not in use;
means for implementing a regeneration cycle for regenerating a filter module once the module is coupled to said regeneration flow path;
means for queuing additional filter modules for regeneration if their permeate output flow rates fall below said predetermined value when said regeneration flow path is in use;
means for actuating said first and second valve means, at the completion of a regeneration cycle, to recouple the regenerated filter module's input to said input conduit and permeate output to said output conduit; and
means, responsive to said queuing means, for sequentially and individually processing in a like manner any additional filter modules to be regenerated.

8. The ultrafiltration system of claim 7 further comprising:
a drain conduit;
third valve means for selectively coupling said regeneration flow path to said drain conduit; and
means for actuating said third valve means to drain said regeneration flow path at the conclusion of each filter module regeneration cycle.

* * * * *